Figure 1:
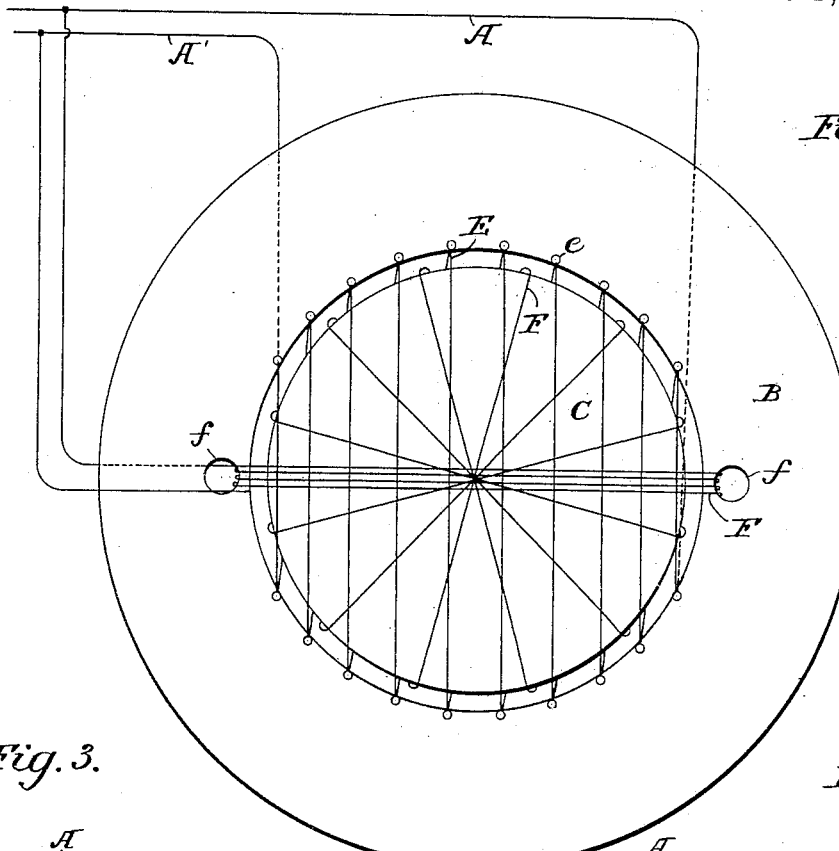

(No Model.)

A. HEYLAND.
ALTERNATING CURRENT MOTOR.

No. 598,092. Patented Feb. 1, 1898.

Witnesses
Harry E. Hay.

Inventor
A. Heyland
by Foster & Freeman
Attorneys

UNITED STATES PATENT OFFICE.

ALEXANDER HEYLAND, OF FRANKFORT-ON-THE-MAIN, GERMANY.

ALTERNATING-CURRENT MOTOR.

SPECIFICATION forming part of Letters Patent No. 598,092, dated February 1, 1898.

Application filed December 29, 1896. Serial No. 617,411. (No model.)

*To all whom it may concern:*

Be it known that I, ALEXANDER HEYLAND, a subject of the Emperor of Germany, and a resident of Frankfort-on-the-Main, Germany, have invented certain new and useful Improvements in Alternating-Current Motors, of which the following is a specification.

With the exception of certain devices involving the use of current diverters or commutators all of the different methods which have been devised for producing mechanical power from single-phase alternating currents have been based upon the principle of dividing the single-phase current into two or more dephased currents and creating thereby a more or less perfect rotary field. The motors constructed on this principle are provided with two or more circuits wound upon the inducing member and connected with the single-phase mains. In all former motors of this class, so far as I am aware, it has been customary to attempt to increase the natural lag of the current in one of these circuits by an increase of self-induction, and this increase has been effected either by the proportioning of windings or by the use of an external inductive resistance. The theory upon which this construction has been based is that in any circuit the lag of the current must increase with an increase of self-induction, and vice versa; but this theory fails to take account of the action of the induced member, which is, in general, of the short-circuited type and of very low resistance. The winding of the induced member acts as the secondary of a transformer and has so great an effect on the phase of the currents in the inducing-circuits that all other internal actions become negligible in comparison therewith. In addition, any increase in the self-induction of a winding fed from a constant-potential source tends strongly to reduce the magnetism generated by that winding. It is well known that the current in any coil excited from a constant-potential source of alternating current is inversely proportional to the square of the number of turns of the coil, while the magnetomotive force generated by the coil is proportional to the product of the current by the number of turns. In any alternating-current induction-motor the torque is due to the mutual action between the field of force generated by one or more of the inducing-coils and the current in the armature. For a maximum starting-torque it is necessary to provide a strong field of force and a powerful armature-current and also to so design the motor that this field and current shall be displaced from each other by one-fourth of the polar pitch and shall be in the same phase. In an ordinary two-phase motor each of the inducing windings acts alternately to generate an armature-current and to provide a field of force to react upon the current generated by the other pole. In a single-phase induction-motor, consisting merely of a short-circuited armature in a simple field, the current in the field induces in the armature, supposing the armature to be at rest, a current which in turn generates a magnetomotive force directly opposite to that generated by the field. It is only when the armature is in rotation, so that its magnetomotive force, necessarily lagging in phase behind the magnetomotive force induced by the field, becomes also displaced in space from the field magnetomotive force that any torque is produced. Such a motor is not therefore self-starting. In a motor constructed according to my invention I generate the armature-current by a simple winding similar to that used in the ordinary single-phase motor, and I generate the field of force necessary to act upon this armature-current to cause torque in a separate winding, which I call the "auxiliary" winding. It is obviously essential that the current in the auxiliary winding should be dephased from the current in the main winding, and it will readily be seen that the best result is obtained when the phase difference amounts to ninety degrees. I therefore design the main winding in such a way that the current therein will not lag greatly behind its electromotive force, and design the auxiliary winding in such a way that its current will lag nearly ninety degrees. It will then be evident that the energy of the motor is supplied almost wholly through the main winding, while the auxiliary winding merely serves as an exciting-winding for generating the necessary field of force and carries an early wattless current. I have shown above that it is necessary, in order that a large current should flow in the auxiliary winding, that its self-induction should be very small; but this requirement has never been met in motors of this type, which are usually designed with exactly the opposite end in view. Remembering that the phase relation between current and electromotive force in any circuit depends not only on the self-induction of the circuit, but and to a much greater extent upon the inverse action due to any short-circuited coils in inductive relation therewith, I am able to construct a single-phase alternating-current motor upon an entirely new principle, which shall be self-starting under load and which shall run with good efficiency and regulation.

Figures 3, 4:
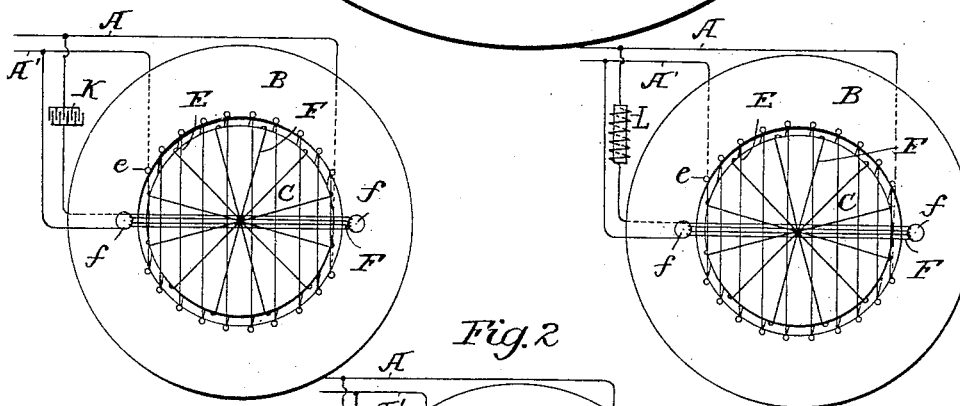
Figure 2:
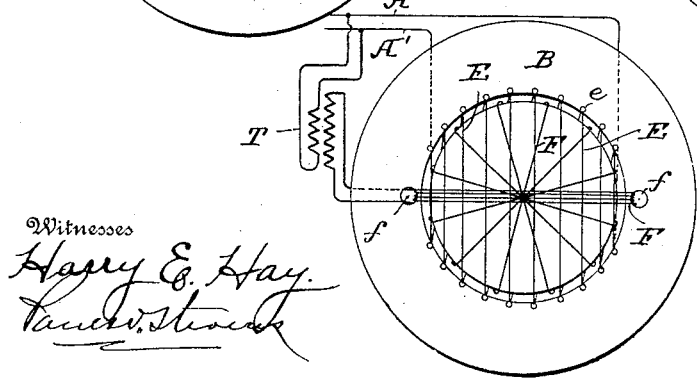

In the drawings attached to this specification, Figure 1 is a diagrammatic representation of a motor constructed in accordance with my invention, and Figs. 2, 3, and 4 show modifications.

Referring more particularly to Fig. 1, A A' are mains supplied from a source of single-phase electromotive force, while B and C are respectively the inducing and induced members of the motor. The inducing member B is provided with a main winding E, distributed in slots $e$ in such a way as to be in close inductive relation to the induced winding F, which latter may be of any preferred type, and is here shown as an ordinary short-circuited winding. The winding E is connected in multiple with the mains A A'. I also provide upon the inducing member B, at an angle with the main winding, an auxiliary winding F, concentrated in the openings $f\ f$ and connected in multiple with the mains A A'. It will be noticed that the openings $f$ are at some little distance from the inner edge of the inducing member, so that a certain amount of magnetic leakage will take place.

The action of a machine thus constructed is as follows: Current flowing in the main winding E will generate a current in the induced winding F, which current will in turn react upon the current in the inducing-winding E to such an extent as to bring it very nearly in phase with its impressed electromotive force, as is the case in any transformer with a short-circuited secondary. The main winding will therefore generate the armature-current which I have above shown to be necessary for the production of torque. At the same time current from the mains A A' will flow in the winding F; but owing to the fact that this winding F is concentrated and therefore is in inferior inductive relation with the secondary, and also owing to the fact that the openings $f$ are located at some little distance from the inner edge of the inducing member, so that a considerable magnetic leakage can exist, the secondary current induced by the action of this winding upon the induced winding and, still more, the reaction of the induced winding upon the phase of the current in the auxiliary winding will be comparatively small, so that the phase difference between current and electromotive force in the auxiliary winding will be analogous to that existing in the primary of a transformer whose secondary circuit is closed on a very high resistance—that is to say, will amount to nearly ninety degrees; but since the number of turns of this winding is comparatively small a very heavy current will flow therein and a powerful field will be created thereby. This field will act, in conjunction with the current generated in the induced member by the main inducing winding, to generate a powerful starting and running torque.

It is obvious that I may procure the powerful field of force which I desire that the auxiliary winding should generate by artificially raising the electromotive force acting upon that winding, in which case, of course, a larger number of turns may be used. I may accomplish this result by interposing between the mains of the auxiliary winding F a transformer T, as shown in Fig. 2.

Instead of using a transformer I may interpose a condenser K, as shown in Fig. 3, which, if properly adjusted, will cause a rise of potential and still allow the currents in the two windings to be sufficiently dephased to create starting-torque.

It will of course be understood that other means may be employed for producing phase difference between the two windings, such as the insertion of an induction-coil or the like, as shown at L in Fig. 4.

I have spoken above of self-induction as affected by the number of turns of a coil; but it is obvious that in windings of the drum type the length of the active wire is the main factor.

It will be obvious that the objects of my invention may be attained by various changes in form and arrangement, the fundamental idea remaining the same. I therefore do not limit myself to the specific forms shown and described; but

I claim as my invention and desire to secure by Letters Patent—

1. The method of producing phase difference between the two inducing-circuits of an alternating-current motor, which consists in causing one of said circuits to be powerfully affected by the reaction of the secondary member of the motor, while reducing the effect of the said reaction upon the other circuit, substantially as described.

2. The combination in an alternating-current motor, of a secondary and a primary member, one winding of the primary member being placed in close inductive relation to the secondary member, whereby the reaction of the current in the secondary will tend to advance the phase of the current in the said winding, and an auxiliary winding in such relation to the secondary member that the reaction of the current in the secondary will to a less degree affect the phase of the current in the auxiliary winding, whereby a phase difference is produced between the current in the two windings of the induced member.

3. The combination in an alternating-current motor, of an armature and two simultaneously-acting inducing-windings, a main winding and an auxiliary winding, the main winding being a distributed winding having a large number of turns, and the auxiliary winding being a concentrated winding, having a smaller number of turns, substantially as described.

4. The combination in an alternating-current motor, of a short-circuited armature, a main inducing-winding, and an auxiliary inducing-winding, the main winding being wound in close inductive relation to the secondary member, and the auxiliary winding being wound in inferior inductive relation to the secondary member, and carrying current lagging behind the current in the main winding, and means for conductively supplying current to both of said windings.

5. The combination in an alternating-current motor, of a short-circuited armature, a main inducing-winding, and an auxiliary inducing-winding, the main winding being wound in close inductive relation to the secondary member, and the auxiliary winding, carrying current lagging behind the current in the main winding, being wound in inferior inductive relation with the secondary member, and containing a smaller number of turns than the said main winding and means for conductively supplying current to both of said windings, substantially as described.

6. The combination in an alternating-current motor, of two inducing-windings, one in close inductive relation to the secondary, and one in inferior inductive relation to the secondary, with means for causing the voltage applied to the second of said windings to be higher than that applied to the first of said windings, substantially as described.

In testimony whereof I have signed my name to this specification in the presence of two subscribing witnesses.

ALEXANDER HEYLAND.

Witnesses:
 JEAN GRUND,
 FRANZ HASSLACHER.